United States Patent
Andersen

(10) Patent No.: US 6,865,655 B1
(45) Date of Patent: Mar. 8, 2005

(54) METHODS AND APPARATUS FOR BACKING UP AND RESTORING DATA PORTIONS STORED IN CLIENT COMPUTER SYSTEMS

(75) Inventor: Bryon Scott Andersen, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 208 days.

(21) Appl. No.: 10/208,066

(22) Filed: Jul. 30, 2002

(51) Int. Cl.[7] .............................................. G06F 12/00
(52) U.S. Cl. ...................... 711/162; 711/161; 707/202; 707/203; 707/204; 714/2; 714/6; 714/15
(58) Field of Search ................................. 711/161, 162; 707/202, 203, 204; 714/2, 6, 15

(56) References Cited

U.S. PATENT DOCUMENTS

| | | | | |
|---|---|---|---|---|
| 5,559,991 A | * | 9/1996 | Kanfi ........................... | 711/162 |
| 5,778,395 A | * | 7/1998 | Whiting et al. ............. | 707/204 |
| 6,611,923 B1 | * | 8/2003 | Mutalik et al. ................ | 714/4 |
| 6,625,625 B1 | * | 9/2003 | Kihara et al. ................ | 707/204 |

* cited by examiner

*Primary Examiner*—Donald Sparks
*Assistant Examiner*—Bao Q Truong
(74) *Attorney, Agent, or Firm*—Barry W. Chapin, Esq.; Chapin & Huang, LLC

(57) ABSTRACT

Mechanisms and techniques operate in a computerized device to perform backup and restore operations on data portions such that if a backup server already has a copy of the content of a data portion, no client computer systems need to transfer a copy of the data portion to the backup server, even if the data portion in those clients has a different name, location, or other attributes. A backup client produces an identification of a data portion stored within a first computerized device to be backed up. The backup client conveys, to a backup server, the identification of the data portion stored within the computerized device and receives, over the communications interface, a transfer indication from the backup server. The backup client determines if the transfer indication indicates that the backup server already contains a copy of the data portion identified by the identification, and if not, the backup client transfers a copy of the data portion from the local storage device to the backup server over the communications interface.

29 Claims, 8 Drawing Sheets

METHODS AND APPARATUS FOR BACKING UP AND RESTORING DATA PORTIONS STORED IN CLIENT COMPUTER SYSTEMS

FIELD OF THE INVENTION

The present invention generally relates to systems for backing up and restoring data associated with computerized devices, and more particularly, to systems, mechanisms and techniques that perform backup and restore operations for networked computer systems.

BACKGROUND OF THE INVENTION

Typical conventional computer systems such as personal computers or workstations often include one or more local storage devices such as disk drives that operate under the control of the computer system to store local data such as application programs and user files. During operation of such a computer system, a user of the computer system may desire to make a backup copy of the data stored within the local storage device in order to safeguard its contents in the event of failure of the local storage device or accidental loss (e.g., deletion) of the data stored within the local storage device. Various conventional technologies exist to allow the user of the computer system to backup data from, and then subsequently restore data to, the local storage device. Some conventional backup and restore technologies operate by providing a local backup device such as a local tape drive or removable disk drive that, under the control of backup and restore software operating within the user's computer, can store files from the local storage device to backup media such as a disk or tape loaded within the local backup device.

Other conventional data backup and restore technologies operate over a computer network in which many different computer systems are networked to each other to allow the rapid exchange of information. In conventional networked backup and restore systems, client software operates on each user's (i.e., client) computer system coupled to the network to communicate with backup server software operating on a backup server computer system which is also coupled to the network. Each conventional client software application on each client computer system interoperates with the backup server software in the backup server computer system in order to transfer copies of data stored locally within the local storage devices of the client computer system for storage within backup devices such as tape drives or disk arrays operating under control of the backup server computer system.

In conventional network-based backup and restore systems, backup server software applications reserve respective backup storage areas within the backup media to store the collective set of data (e.g., files, applications, and the like) backed up from each respective client computer system. In other words, conventional networked backup and restore technologies operate in a one-to-one backup and restore relationship between each client computer system and the backup server. In the event of a failure of a local storage device within a particular client computer system, a user of the client computer system can operate client restore software to communicate with the backup server to restore the data from the backup storage area or areas assigned to that client computer system. This results in the transfer of data stored within the backup server within that client computer system's backup storage area (i.e., files and applications previously backed up from the client computer system) to the client computer system in order to restore the data for that client computer system to the local storage device in that client computer system.

There are two conventional strategies associated with performing backups of data. A "full" backup causes client backup software to transfer every file and directory stored on the local storage device of a client computer system to the backup server for storage into the backup storage area, thus developing a full or complete copy of the data stored within the client computer system. An "incremental" backup causes the backup client to back up to the backup server only data files that have changed within the client computer system since a particular previous backup was performed. Incremental backups are also commonly referred to as "differential" backups since they capture the difference between the current state of a client file system and the state of client file system as it existed at the time of a previous backup. A full backup can provide a complete set of data to be used in a restoration process of a client whereas a restoration procedure using incremental backups can include a more complex process of having to reference one or more incremental backups in order to retrieve and restore the required data. Frequently, conventional backup systems implement a combination of less periodic full backups (e.g., once a month) in combination with more frequent incremental backups (e.g., nightly) in order to provide backup coverage for data stored within client computer systems. Full backups take longer to accomplish and utilize more processor resources and network bandwidth whereas incremental backups typically take less time and consume less processor and the network resources.

SUMMARY OF THE INVENTION

Conventional techniques and mechanisms for backing up and restoring data to and from user computer systems over a network suffer from a variety of deficiencies. In particular, as many computer network environments such as corporate local area networks contain many tens, hundreds or even thousands of user or client computer systems, conventional backup strategies do not operate efficiently to backup all applications and data stored on local storage devices within user computer systems. Instead, information technology departments in such corporations either inform users that the conventional backup system is not setup or configured to backup any data stored within local storage devices within user computer systems or, the information technology department configures conventional backup client software to significantly limit the areas of the local storage devices that backup software will back up. As an example, the information technology department of the company may configure all client backup software operating on user computer systems to only backup user specific directories (e.g., a user's home or work directory) or a "My Documents" directory (in a Microsoft Windows environment). The reason for not backing up to the entire contents of local storage devices within all user computers on a local area network is due largely in part to the amount of backup storage and networking resources that are required to perform full backups of all user computer systems on a regular basis. The storage capacity of local storage devices coupled to user computer systems has grown dramatically in recent years. Computer disk drive sizes of forty or eighty gigabytes are not uncommon. To backup all of this data on a regular basis would consume massive amounts of resources and the backup storage and processing costs would be prohibitive.

In addition, application programs are often installed pervasively on user computer systems. As an example, in a particular corporation, the information technology department may install copies of the same operating system, word processing application, spreadsheet program, and the like within the local storage devices of each client computer system. Since conventional backup technologies that backup data from a client computer system do not distinguish between identical files, such systems attempt to capture the entire amount of data within each local storage device, therefore redundantly backing up the same files from multiple computers. As such, there can be significant amounts of redundant data (e.g., multiple copies of the same file or application) stored within a conventional backup server computer system. As an example, conventional backup systems backup separate copies of the same operating system and applications for each client computer system.

Embodiments of the invention significantly overcome such deficiencies of conventional backup and restore mechanisms and techniques. Embodiments of the invention provide a backup client process and backup server process that operate with each other to form a backup and restore system that backs up data portions such as files, application programs or the like stored within a plurality of computerized devices, referred to herein as user or client computer systems, to a backup server computer system, such that redundant data portions (e.g., two or more copies of the same file) stored on the same or on different client computers are backed up (i.e., copied) to the backup server computer system only once. As an example, consider a situation in which many client computer systems on a network each operate a local storage device (e.g., a local disk) that stores (i.e., has installed) a copy of the same software application, such as a word processing program. Embodiments of the invention operate on both the backup server computer system and each client computer system in order to create a single backup copy of the word processing program application files (i.e., data portions) within the backup server computer system. This single backup copy of these data portions may be restored, as needed, to one or more of the client computer systems. Embodiments of the invention thus avoid having to store redundant backup copies of the same data portions (e.g., multiple copies of the same word processing program) in a backup storage area.

More specifically, embodiments of the invention provide methods and apparatus for backing up and restoring data portions stored within at least one computerized device such as a client computer system. One such method embodiment is performed by a backup client process and comprises the steps of discovering a plurality of data portions stored within a computerized device (i.e., determining which data portions are to be backed up). The computerized device can be a user or client computer system and this discovery process can involve the user of such a computer system identifying or otherwise indicating to the backup client specific directories, storage devices, individual files, disk partitions, volumes, specific individual software applications, data files or other such data entities from which to backup data portions.

For each data portion in the plurality of data portions identified during the discovery process, the method embodiment produces an identification of that data portion stored within a first computerized device. The identification of a data portion is a unique fingerprint of the data or content part of that data portion, such as a checksum or hash value (e.g., MD5 hash) calculated on the contents of the data portion. The identification uniquely identifies the data portion content and is (i.e., would be) equivalent for each instance of that data portion that may be stored in multiple locations within this computerized device, or within other computerized devices. In other words, the backup client configured according to embodiments of the invention produces a fingerprint of the data portion that would be the same if produced in any other computer system that also operated an instance of the backup client that computed an identification of another copy of another instance of that same data portion.

Embodiments of the invention (i.e., a backup client) convey, to a backup server computer system operating the backup process, the identification (e.g., the fingerprint) of the data portion stored within the computerized device. The identification or fingerprint allows the backup server computer system to determine whether or not a copy of the data portion associated with the identification or fingerprint has already been backed up to the backup server computer system during a previous backup operation of this data portion by this or by another client computer system. In other words, based on the identification produced by a backup client operating in one client computer system that is sent to the backup server, the backup server can determine if a data portion corresponding to this identification is already stored within a backup storage area under control of the backup server. In response, the backup server forwards a transfer indication to the backup client operating in the client computer system. The transfer indication in one case indicates that the backup server does not already have a copy of the data portion associated with the identification. Alternatively, if the backup server does maintain a copy of the data portion associated with the identification, the transfer indication indicates the backup server already has a copy of the data portion and also includes a backup server key that can be used by the backup client to obtain the data portion from the backup server if needed (e.g., for a restore).

The backup client receives the transfer indication from the backup server and determines if the transfer indication indicates that the backup server already contains a copy of the data portion identified by the identification. If not, the backup client transfers a copy of the data portion to the backup server for backup storage purposes. This process is repeated for all data portions discovered in the step of discovering. In this manner, embodiments of the invention allow a backup client operating on a client computer system to uniquely identify data portions to be backed up and to communicate this identification to the backup server process to determine if the backup server process already contains a backup copy of the data portion identified by the backup client. If the transfer indication indicates that the backup server does not contain a copy of the data portion corresponding to the identification, the backup client can transfer a copy of the data portion to the backup server for backup storage. The backup client operating in the computerized device thus only provides a copy of the data portion to the backup server if the backup server does not already have a copy of the data portion.

During the aforementioned processing, in one embodiment of the invention, the backup client maintains a catalog containing a separate catalog entry for each instance of each uniquely identified data portion. Each catalog entry includes one of more instance entries for each instance (e.g., each copy in a different location on the client, if more than one copy exists) of the data portion stored (e.g., discovered) within the client computer system. Each catalog entry contains metadata specifying attributes associated with that instance of the data portion stored within the computerized device. Generally, the information associated with an instance entry for a data portion contains all of the information required to fully restore the data portion to the specific client computer system location identified within that instance entry, other than the actual data or content of the data portion itself. As an example, an instance entry for a data portion can include metadata or attribute information including such things as a specific storage location within the computerized device in which this instance of this data portion is located (e.g., the specific path and filename), any general file attributes associated with this instance of this data portion (e.g., date and time, ownership information, file permissions and the like), any computer specific file attributes associated with this data portion (e.g., finder information, creator codes, or other information specific to this instance of this data portion on this client computer system) and a copy of the backup server key (used to obtain the data for the data portion during a restore operation).

In one embodiment of the invention, as the backup client discovers data portions to be backed up during processing of the backup sequence, after producing the identification of a data portion of the for transferring the identification to the backup server, the backup client can determine if the identification of the data portion is contained within a pre-existing catalog (e.g., previously generated or an identification in the current catalog generated thus far) maintained within the computerized device, thus indicating that the data portion has been previously backed up at least once by the backup server. If so, the backup client bypasses the steps of conveying the identification to the backup server, receiving a transfer indication from the backup server and determining if the transfer indication indicates that the backup server already contains a copy of the data portion, such that a copy of the data portion is not transferred to the backup server. In this manner, once the data portion fingerprint is calculated, if this fingerprint identification exists in a previously generated catalog (or in entries in the current catalog) generated by (and accessible to) that computerized device, then the backup client can be assured that the data portion associated with the fingerprint is already maintained in the backup storage by the backup server and thus the backup client does not need to perform the processing involved to inquire with the backup server to determine if the backup server already maintains a copy of this data portion.

Embodiments of the invention also provide a backup client that transfers a copy of the catalog for a particular backup sequence to the backup server for storage. In this manner, the backup server can maintain a collection of past catalogs that the backup client generated during previous backup sequences performed for that particular computerized device. As will be explained, the backup client is able to obtain past catalogs in order to perform a catalog comparison to identify any modifications made to the storage of data portions within the client computer system.

Embodiments of the invention further provide the ability of the backup client operating on a client computer system to restore data portions maintained as backup copies within the backup server. Generally, to do so, the backup client obtains a catalog selection. This can involve the user selecting a specific catalog from which to select instances of data portions to be restored to the client computer system. The user can select from the existing catalog or from a set of previously generated catalogs maintained by the backup server. The user then select instances of data portions from within the catalog that are to be restored to the computerized device. Then, for each data portion to be restored, the backup client provides the backup server key corresponding to the selected instances to the backup server to obtain a copy of the data portion of the backup server. In response, the backup client receives a copy of the data associated with the data portion (i.e., receives the data portion from the backup server). Then, for each instance of the data portion to be restored to the computerized device, the backup client obtains catalog instance entry information for that instance of the data portion and copies the data portion to the storage location identified in the catalog instance entry information and then restores any other attributes associated with that instance of the data portion such as file permissions, ownership and the like as specified within the instance entry for that data portion within the catalog. In this manner, embodiments of the invention are able to restore data portions to their original locations such that they contain their original file attributes.

Other embodiments of the invention include a computerized device, workstation, handheld or laptop computer, or the like configured with software and/or circuitry (e.g., a processor as summarized above) to process any or all of the method operations disclosed herein as embodiments of the invention. In other words, a computerized device or a processor that is programmed or configured to operate as explained herein as either a backup server or backup client computer system is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as a processor. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
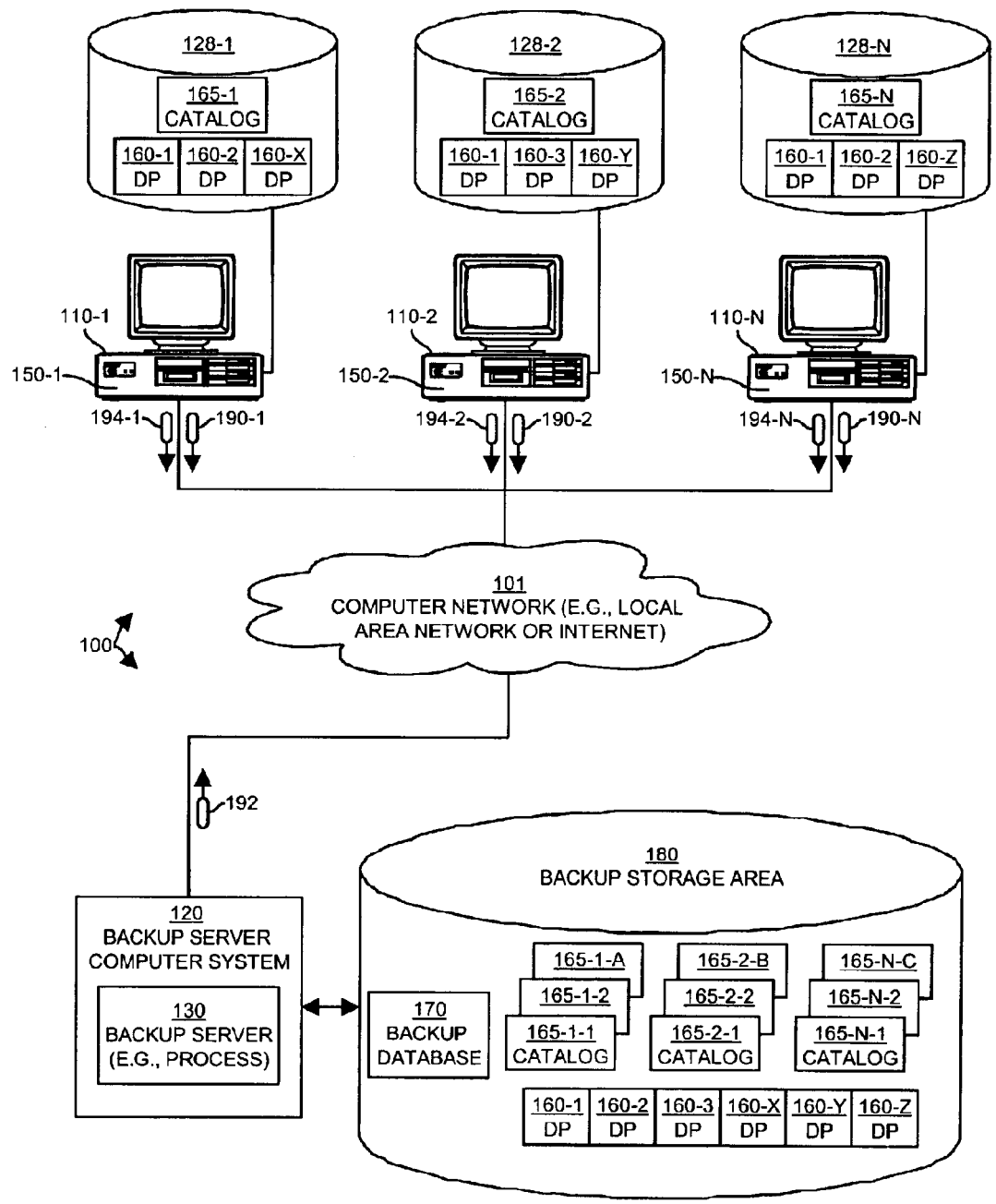
FIG. 1 illustrates a computing system environment suitable for use in explaining example operations of embodiments of the invention.

FIG. 1 illustrates a computer network environment 100 suitable for use in explaining example operations of embodiments of the invention. The computer network environment 100 includes a computer network 101 such as a local or wide area network (e.g., a corporate network, or the Internet) that interconnects a plurality of client computer systems 110-1 through 110-N (i.e., computerized devices) to a backup server computer system 120. Each client computer system 110 includes an associated respective local storage device 128-1 through 128-N such as a disk drive that may be installed within, or as a peripheral device attached adjacent to each client computer system 110. Each client computer system 110 stores, within its respective local storage device 128, local copies of data portions 160 that can include software applications, programs, files, data or other information stored locally to that client computer system 110. Note that some client computer systems 110 store equivalent copies of the same data portion 160, that are each a separate instance of the same data portion 160. As an example, the client computer systems 110-1, 110-2 and 110-N each store a separate copy or instance of data portion 160-1.

Each client computer system 110 also operates (e.g., executes, runs, interprets or otherwise performs) a respective backup client 150 (e.g., a software application and process) that operates according to the techniques explained herein. As will be explained in more detail, during a backup sequence, each backup client 150-1 through 150-N creates and maintains a respective catalog 165-1 through 165-N that contains a catalog entry including at least one instance for each data portion 160 that is backed up to the backup server computer system 120.

The backup server computer system 120 operates a backup server application and process 130 that interoperates over the computer network 101 with the respective backup clients 150 operating within each client computer system 10 according to the techniques explained herein. The backup server 130 maintains data within a backup storage area 180 that is a high-capacity data storage device such as a disk or tape array. In particular, and as will be explained in more detail, the backup server 130 maintains a backup database 170 that identifies, among other things, the storage locations within the backup storage area 180 of each of the data portions 160 backed up from the client computer systems 150. In addition, the backup server 130 receives, as will be explained, the catalog 165 for each client computer system 110 during a backup sequence performed by the backup client 150 operating in a client computer system 110. Accordingly, each time a backup client 150 in a client computer system 110 performs a backup sequence of data portions 160, the backup client maintains and transfers a current catalog 165 (e.g., 165-1-1-, 165-1-2, . . . 165-1-A for client computer system 110-1) generated during operation of the backup sequence to the backup server 130 for storage within the backup storage area 180.

Also illustrated in FIG. 1 are messages 190, 192 and 194 exchanged between the client computer systems 110 and the backup server computer system 120. These messages include an identification or fingerprint of one or more data portions 194, a transfer indication 192, and a copy of a data portion (i.e., data portion data or content) transferred from a client computer system 110 to the backup server computer system 120. The specific purpose of these messages will be explained in detail below.

Generally, embodiments of the backup client 150 and backup server 130 operate such that if a particular entire data portion 160 such as a data file, software application, database, or other entity of data exists (i.e., is stored) in multiple different locations within the same or within different local storage devices 128 on any one, some, or all of client computer systems 110, only one of the backup clients 150 transfers that data portion 160 for backup or archival purposes to the backup server 130 only one time during a first backup sequence that involves backing up that data portion 160. Thereafter, if that backup client 150 performs another (i.e., second) backup sequence on the same client computer system 110 for the same or a different instance of that data portion, or if another backup client 150 performs another backup sequence on a different client computer system 110 which happens to contain another instance of that same data portion 160 (e.g., a second copy of the same data file or another installation of the same software application on another client computer), the backup client 150 performing that second backup sequence can operate as explained herein to identify that the backup server 130 already maintains and contains a backup copy of the data portion 160 and thus there is no need to transfer a backup copy of the data portion 160 over the computer network 101 to the backup server 130 for archival purposes.

As a result of this general operation, embodiments of the invention significantly reduce the amount of processing and network resources required to perform a backup of data portions 160 stored in the collective set of client computer systems 110-1 through 110-N. This is because for any data portions 160 that the client computer system 110 maintains within its local storage device 128 that any backup client 150-1 through 150-N has already sent to the backup server 130 for backup storage (in a previous backup sequence), the backup client 150 operating a current backup sequence can bypass an operation of sending the entire data or content of the data portion 160 to the backup server 130. Further details of the operation and interaction of a backup client 150 and the backup server 130 will be explained next with respect to the remaining figures.

It is important to note that one advantage of the invention is that once one backup sequence is performed for a client computer system 110, subsequent back sequences will only require a need of the backup client 150 to transfer newly created data portions to the backup server 130. Any data portion that has been backed up at least once, even if not from the same location or the same computer (e.g., could be the same data portion with a different filename, or located in a different directory in the same computer, or could be on another computer under another filename but for which that other computer has performed a backup sequence) eliminates the need for the backup client 150 to transfer the content of the data portion to the backup server 130.

Figure 2:
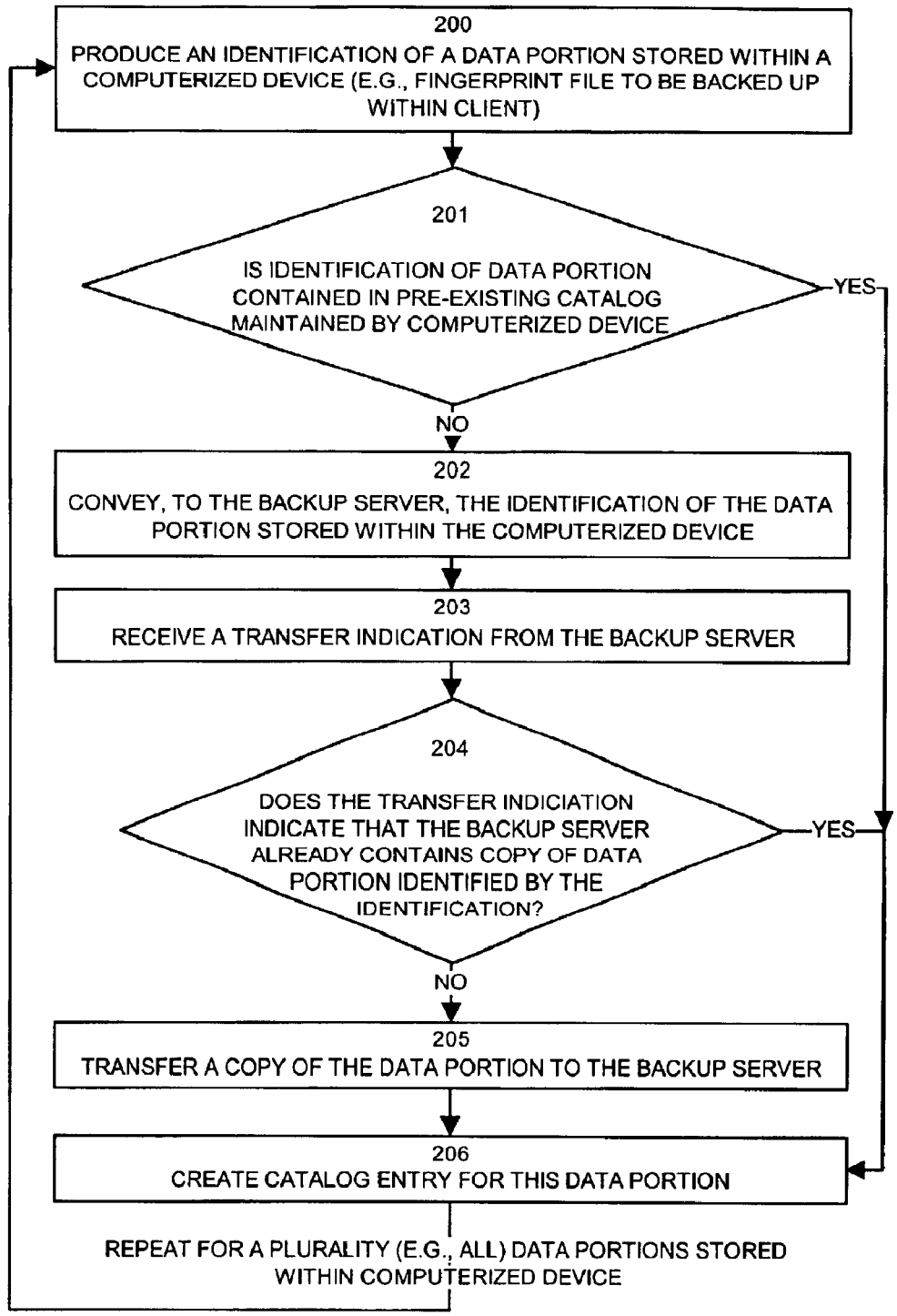
FIG. 2 is a flow chart of processing operations that a backup client performs to backup data portions according to one example embodiment of the invention.

FIG. 2 is a flow chart of processing steps performed by a backup client 150 (i.e., an application operating as a process)

configured according to one example embodiment of the invention to interact with the backup server 130 in order to backup data portions 160 stored within a local storage device 128 associated with a client computer system 110. Generally, the repetitive processing of the backup client 150 performing the processing of steps 200 through 206 forms a backup sequence that the backup client 150 may perform, for example, on a nightly, weekly or monthly basis or at any periodic or user selected interval(s) on each of the client computer systems 110. Such a backup sequence may carry out a full backup or an incremental backup. The discussion of the details of processing steps 200 through 206 in FIG. 2 (i.e., operation of a backup client 150) will be discussed in relation to their operation of the backup client 150-1 within the client computer system 110-1 illustrated in FIG. 1. It is to be understood that the operation of other backup clients 150-2 through 150-N in other client computer systems 110 perform similar operations.

In step 200, the backup client 150 produces an identification 194 of a data portion 160 stored within the computerized device 110 (e.g., the data portion 160 stored within the local storage device 128 associated with a client computer system 110). In one embodiment of the invention, the identification of a data portion 160 is a fingerprint of the data portion 160 such as a hash value or checksum of the content or data within a file or application that uniquely identifies the data portion and that is equivalent for each instance of a same data portion that may be stored in multiple locations within any one or more of the client computer systems 110. Thus, if two computerized devices 110 respectively store at least one instance of the same data portion, the identification produced in the step 200 is the same for each instance of the same data portion 160 when performed on any of the computerized devices 110.

Next, in step 201, the backup client 150 operating within the client computer system 110 determines if the identification 194 of a data portion 160 is contained within a preexisting catalog 165 maintained by (i.e., in some manner accessible to) the computerized device 110. As will be explained shortly, a catalog 165 is created during each backup sequence in order to store information about instances of data portions 160 that are to be backed up, whether or not the actual data for the data portion 160 is required to be transferred to the backup server computer system 120. As an example, suppose a user of a client computer system 110-1 creates, copies or otherwise instantiates a new instance of the data portion 160-1 (e.g., creates a new file or installs an application) in the local storage device 128-1. During this iteration of the backup sequence illustrated in FIG. 2 (i.e., during the repetitive execution of steps 200 through 206 by the backup client 150), the backup client 150 will discover the new data portion 160-1 and will produce an identification 194 (in step 200) of this data portion 160-1. If this data portion has never been "seen" by a backup sequence on this client computer system, then the identification 194, which is a unique fingerprint of the data or content of the data portion 160, will not yet exist within the catalog 165-1. In addition, since the data portion 160-1 is a new file on this client computer system 110-1, other (i.e., older or previously created) catalogs 165 produced as a result of other backup sequences on this client computer 110-1 will not contain the identification of the data portion 160-1 either. Such older catalogs 165 may be cached locally by the backup client 150 for a past predetermined number of backup sequences, or at the beginning of a backup sequence, the backup client can obtain the previous catalogs 165 for this computerized device from the backup server 130.

In any event, as will be explained, the lack of the identification 194 in a catalog 165 indicates to the backup client 150 that this particular client computer system 110-1 has not yet backed up an instance of this data portion 160-1 to the backup server 130 (other computer systems may have however, as will be explained). Assuming the identification 194-1 of the data portion 160-1 is not contained in a preexisting catalog 165 maintained by the computerized device 110-1 performing this backup sequence, processing then proceeds to step 202.

In an alternative, if the processing logic of the backup client 150-1 in step 201 determines that a catalog 165 associated with the client computer system 110-1 does contain the identification 194-1, then the backup server 130 must have a copy of the data portion and backup client processing proceeds to step 206 for creation of a catalog instance entry for this particular instance of the data portion 160-1. The details of creating catalog instance entries for data portions will be explained later with respect to step 206. Assuming for this example discussion that the identification 194 produced in step 200 is not contained within any pre-existing catalog 165 accessible by the client computer system 110-1, processing proceeds to step 202.

In step 202, the backup client 150 conveys, to the backup server 130, the identification 194-1 of the data portion 160 stored within the computerized device 110. In response to step 202, the backup server 130 receives the identification 194 of at least one data portion the backup by a client computer system 110. In response, the backup server 130 prepares and returns a transfer indication 192 sent to the backup client 150 operating within the client computer system 110 that originated the identification 194 sent to the backup server 130 in step 202. Processing steps related to the backup server 130 will be discussed later with respect to the flow chart in FIG. 7.

Next, in step 203, the backup client 150 receives the transfer indication 192 from the backup server 130. It may be the case that another client computer system 110-2 through 110-N (other than the client computer system 110-1 that is performing the backup client 150 for the current backup sequence) also contains a copy of the same data portion 160-1. This is illustrated in FIG. 1 by the data portion 160-1 existing within each local storage device 128-2 through 128-N associated with the other client computer systems 110-2 and 110-N. Perhaps the data portion 160-1 is a copy of a software application installed on each client computer system 110. The transfer indication 192 received from the backup server 130 indicates whether or not the backup server already contains a copy of the data portion 160-1 (i.e., stores its data or content) and if so, includes a backup server key (312 in FIG. 3, to be explained shortly) that the backup client 150 can later use to identify to the backup server 130, during a restore operation, where to obtain the data portion 160-1 within the backup storage area 180.

In step 204, the backup client 150 determines if the transfer indication 192 indicates that the backup server 130 already contains a copy of the data portion 160 identified by the identification 194-1. If the transfer indication 192 indicates that the backup server 130 already contains a copy of the data portion 160-1 identified by the identification 194-1, processing proceeds to step 206 for creation of a catalog instance entry for this instance of the data portion 160-1 because the backup server 130 already has a backup copy of that data portion 160. The backup server 130 may already include or contain a copy of the content or data associated with the data portion 160-1 identified or associated with an identification 194-1 if, for example, another client computer system 110-1 through 110-N has already performed a backup sequence as illustrated in FIG. 2 for a set of data portions 160 that included the specific data portion 160-1 to which the identification 194-1 corresponds. In other words, according to the processing illustrated in FIG. 2, when the backup server 130 receives the identification 194 from a particular backup client 110 and consults its backup database 170, if the backup server 130 detects the presence of the identification 194 within the backup database 170, then the backup server 130 returns a transfer indication 192 that contains a backup server key indicating the backup server 130 already has the data portion and that can later be used by the backup client 150 in event that the data portion 160 needs to be restored. Alternatively, in step 204, if the transfer indication 192 indicates that the backup server 130 does not currently maintain or store a copy of the data portion 160-1 identified by the identification 194-1, processing proceeds to step 205.

In step 205, the backup client 150-1 operating in the client computer system 110-1 transfers a copy of the data portion 160-1 to the backup server 130 for storage within the backup storage area 180. In this manner, the backup server 130 only receives a copy of the content or data within a data portion 160 the first time any backup client 150-1 through 150-N encounters the first instance of a data portion 160. Thereafter, if that same backup client 150 performing either the same backup sequence or another backup sequence, or, another backup client performs a backup sequence to which encounters a data portion 160 for which the same identification is produced in step 200, the backup server 130 will receive a copy of this identification 194 and will detect that a copy of the data portion 160 is already contained within the backup database 170 in the backup storage area 180. As such, the transfer indication 192 that the backup server 130 returns to the backup client 150 will indicate to that backup client 150 that the backup server does not need to obtain a copy of the data portion 160 since it already has this information.

Next, in step 206, the backup client creates a catalog instance entry for this particular data portion 160 being processed in this iteration of the backup sequence illustrated by the processing steps in FIG. 2. Note that in this embodiment of the invention, a catalog instance entry is created for every instance of a data portion 160 processed by steps 200 through 205. In other words, even though in step 201 a previous catalog 165 associated with the client computer system 110 contains the identification of a data portion, or, even though in step 204 the transfer indication might indicate that the backup server 130 already maintains a copy of the data portion 160, in both cases, the transfer of the data portion to the backup server is not required or performed but the backup client 150 still creates a catalog instance entry associated with this instance of the data portion 160. In this manner, the catalog 165 created for iterations of the processing steps 200 through 206 for the plurality of data portions 160-1 through 160-X (i.e., for all data portions stored within the local storage device 128-1 for the client computer system 110-1) contains a complete record of each instance of all data portions 160 processed in that backup sequence and that existed in the client computer system 110 at the time of that backup sequence. Accordingly, in this embodiment of the invention, the backup client 115 produces a catalog 165 for each backup sequence that reflects a complete picture or list of all data portions processed during that backup sequence.

As will be explained next with respect to FIG. 3, creation of a catalog entry for a data portion involves the backup client 150 storing, for each instance of the data portion processed during the backup sequence, meta data associated with that instance of the data portion that specifies attributes associated with the data portion 160 for that local storage device 128 for that client computer system 110. In other words, a catalog entry for a data portion 160 within the catalog 165 contains all information required to restore each instance of the data portion stored within the local storage device 128 except for the content of the data portion 160 itself. Catalog instance entry information can include metadata attributes such as, for example, file ownership information, file permission information, date and time information, or computer specific information such as defined or properties, creator codes, file types and the like. Details of the contents of one example catalog 165 configured according to one embodiment of the invention will be discussed next with respect to FIG. 3.

Figure 3:
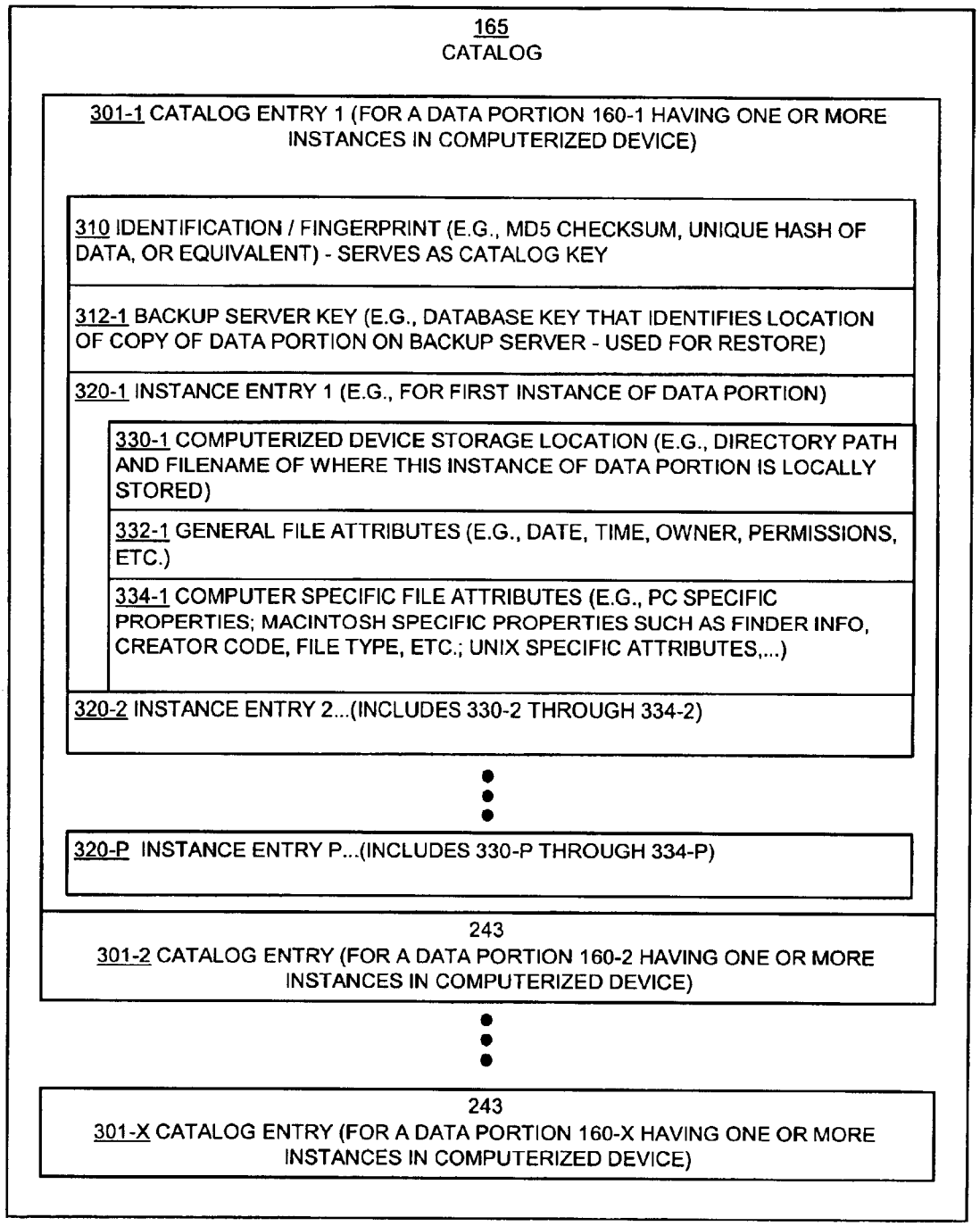
FIG. 3 illustrates an example of catalog content according to one example embodiment of the invention.

FIG. 3 illustrates example contents of a catalog 165 associated with the client computer system 110-1 configured according to one embodiment of the invention. The catalog 165 in this example includes a plurality of catalog entries 301-1 through 301-X. Each catalog entry 301 to corresponds to the existence of different data portions 160-1, 160-2 and so forth within a client computer system 110 to which this catalog 165 is associated (i.e., created by the backup client 150 performing a backup sequence in a computerized device 110). As an example, if the backup client 150 discovers, during a single backup sequence, that the same data portion 160 exists in three different locations of a filesystem within the local storage device 128 within a client computer system 110, the backup client 150 only creates a single catalog entry 301 for that data portion 160. The catalog entry 301 includes a copy of the identification 194 or fingerprint that the backup client 150 computes as the same value for each of the three instances of the data portion 160. In addition, the backup client 150 maintains a copy of the backup server key 312 for this data portion 160 and creates, for each instance of the data portion, a respective instance entry 320-1 through 320-P (where P would be equal to three in this example).

The backup server key 312 stored within the catalog entry 301 for a data portion 160 identifies a specific database key or other information that the backup server 130 can use to specifically identify which copy of the data portion 160 stored within the backup storage area 180 is associated with this catalog entry 301. The backup server key 312 may be based on the identification 194 of a data portion. A backup client 150 can obtain the backup server key 312 for a particular data portion from a catalog entry 301 within a previous existing catalog 165 for which the identification 194 of a data portion 160 is detected in step 202 as discussed above with respect to FIG. 2. Alternatively, the backup client 150 can obtain the proper backup server key 312 for a data portion 160 within the transfer indication 192 to the backup server 130 provides to the backup client 150 during the processing of step 203 in FIG. 2 as discussed above. In other words, when processing a data portion according to the processing of FIG. 2, when the backup client 150 discovers an instance of a data portion 160, if this is the first instance of this data portion 160 discovered during this backup sequence, the backup client 150 performs the processing discussed above and either detects the identification of this data portion 160 within a catalog 165 produced from a previous backup sequence or, alternatively, queries the backup server 130 to determine if the backup server 130 already contains a copy of this data portion 160. In either case, if a previous catalog contains a catalog entry 301 containing the identification 194 for this data portion 160 or if the backup server provides a transfer indication 192 indicating that the backup server 130 already contains a copy of this data portion, the backup server key 312 for this data portion is available to the backup client 150 either from the previously existing catalog 165 or is provided by the backup server 130 within the transfer indication 192. In cases where neither the catalog nor the backup server indicate the existence of the data portion 160 (thus a transfer of the data portion must take place from the client 150 to the server 130), the backup client 150 can receive an acknowledgment of the transfer of the copy of the data portion 160 to the backup server 130 in step 205 which can include the backup server key 312 associated with this data portion 160.

As will be explained shortly, the backup client 150 can use the backup server key 312 during a restore operation to identify which data portion content within the backup server 130 is to be returned to the backup client 150 in order to restore a data portion 160.

Note that the backup server key 312 only provides access to the data or content of the data portion 160 from the backup server 130. As such, in addition to a catalog entry 301 containing the identification 194 and the backup server key 312 for the data portion 160 associated with this catalog entry 301, the catalog entry 301 also contains separate respective instance entries 320-1 through 320-P for each separate copy of the data portion 160 processed during a particular backup sequence. In other words, for three copies of the same data portion 160-1 contained in three different locations within the file system of a local storage device 128, the backup client 150 creates three different instance entries 320-1 through 320-3 within the single catalog entry 301-1. The metadata attributes (fields 330, 332 and 334, to be explained) in each instance entry 320 provide the attributes such as the different locations that distinguish each different copy of the same data portion 1601.

Within a single instance entry 320 (320-1 illustrated in detail in the example in FIG. 3), the backup client 150 stores metadata including computerized device storage location information 330-1, general file attributes 332-1 and computer specific file attributes 3341. For any instance entry 320, the computerized device storage location information 330 includes information pertaining to the specific storage location of this instance of the data portion 160 to which this catalog entry 301 relates. This can include, for example, a directory path and a filename indicating where this instance of the data portion 160 is locally stored within the local storage device 128 and what the file name is for this instance of this data portion 160-1. The general file attribute information 332 includes, for example, such things as a creation or last modified date and time associated with this instance of the data portion, ownership information, permissions, and the like. The computer specific file attribute information 334 includes computer specific properties and metadata that are particular to this instance of the data portion 160 in this client computer system 110.

As an example, if the client computer system 110 is a Macintosh computer system manufactured by Apple Computer, Inc., the computer specific file attributes 334 may include finder information, creator codes, file types and the like. If the client computer system 110 is a Unix-based computer system, the computer specific file attributes 334 may include properties or attributes that are Unix-specific. Likewise, other types of client computer systems 110 such as personal computers, mainframes or the like may operate respective backup clients 150 configured according to embodiments of the invention to store any information related to this instance of the data portion 160 that is specific to that type of computer system within the computer specific file attributes 334 for this instance of the data portion 160.

As will be explained, during a restore operation, the instance entry information 320 provides all information associated with each instance of the data portion other than the data or content of the data portion itself. To get the data portion data itself, the backup client 150 provides the backup server key 312 to the backup server 130 in order to obtain the correct data or content associated with the data portion 160 which is copied to each computerized device storage location 330 associated with each instance entry 320 for the catalog entry 301 associated with that data portion 160. The instance entry information 330 through 334 thus allows the backup client 150 to properly restore all attributes associated with each specific instance of the data portion 160 within the client computer system 110. As an example, if three instances of the same data portion 160 exist in three different locations within the local storage device 120, each may have different file permissions settings, different creation date and times and different ownership or user information. The instance entry information 330 through 334 for each instance of this data portion 160 contains all of the instance specific information for each of these three instances of the same data portion. The data or content within the data portion 160 however is identical and thus the backup client 150 will produce the same identification or fingerprint 194 for each instance of this data portion 160.

Accordingly, the catalog entry 301 for a data portion 160 (i.e., for data or content) includes a catalog instance entry 320 for each different instance (i.e., each separate copy located in a different location, if any) of that data portion stored within the computerized device 110. Each catalog instance entry 320 contains all the information required to restore that data portion to a location associated with that instance entry, other than the data or content of the data portion itself that the backup server maintains. The backup server 130 thus maintains a single copy of the contents of each unique data portion (e.g., a single copy of a word processor application) 160, whereas the backup client 150 maintains separate instance entries 320 in a catalog 301 for each discovered instance of the data portion and each instance entry 320 contains all the other information required to reinstate or restore that data portion 160 to one specific location within the client computer system (but does not contain the data or content of the data portion itself).

Figure 4:
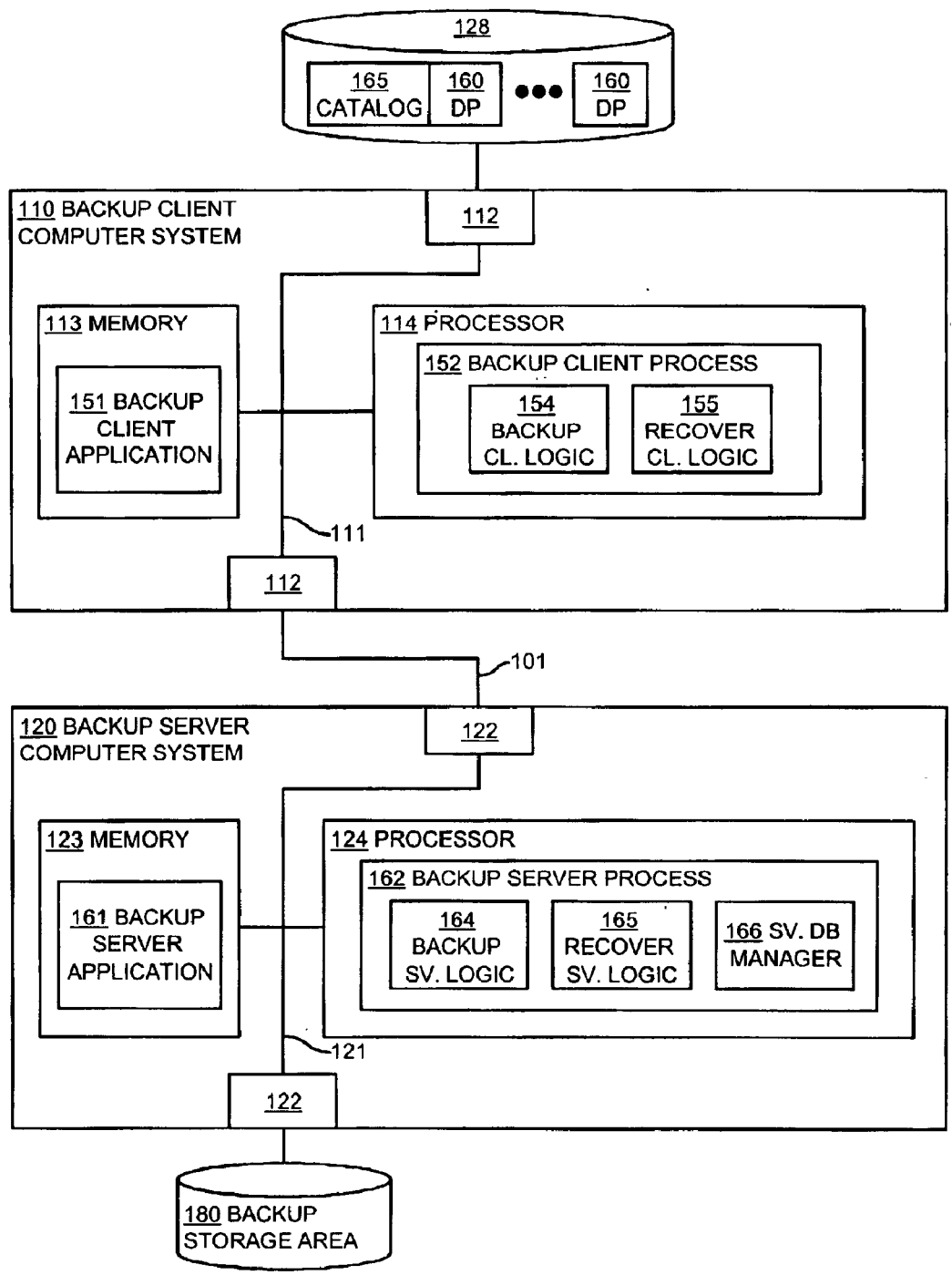
FIG. 4 illustrates example architectures of a backup client and backup server computer systems configured according to one embodiment of the invention.

FIG. 4 illustrates an example of the architecture of a client computer system 110 and a backup server computer system 120 configured according to one example embodiment of the invention. Each of the client computer systems 110 and the backup server computer system 120 respectively include an interconnection mechanism 111, 121 such as a data bus or other circuitry that interconnects a memory 113, 123 and a processor 114, 124. The processors 114, 124 may be any type of central processing unit, controller, microprocessor, programmable gate array (PGA) or other circuitry that are capable of executing, interpreting, operating, being configured with, or otherwise performing sets of logic instructions such as computer program code. The memory 113, 123 may be any type of computer readable medium such as electronic semiconductor memory (e.g., Random Access Memory or Read Only Memory), programmable memory (e.g., EEPROM), or another storage or enclosable medium such magnetic or optical disk storage and may be removable or permanently fixed to the computer systems 110, 120.

The memory 113 in the backup client computer system 110 is encoded with a backup client application 151. The processor 114 is capable of accessing the memory 113 to execute, perform, interpret or otherwise operate the backup client application 151 to form the backup client process 152 that includes backup client logic 154 and recovery client logic 155 that operate according to the techniques explained herein associated with the backup client 150. Likewise, the memory 123 in the backup server computer system 120 is encoded with a backup server application 161. The processor 124 is capable of accessing the memory 123 to execute, perform, interpret or otherwise operate the backup server application 161 to form the backup server process 162 that includes backup server logic 164, recovery server logic 165, and a server database manager 166 that operate according to the techniques explained herein associated with the backup server 130. It is to be understood that a memory encoded with the backup server and/or backup client applications 151, 161 are computer readable medium embodiments of the invention, as are the processors 114, 124 that are configured to operate backup server and/or backup client processes 162, 152. Also, an entire computer system or computerized device configured to operate as a backup server or backup client is considered an embodiment of this invention.

Figure 5:
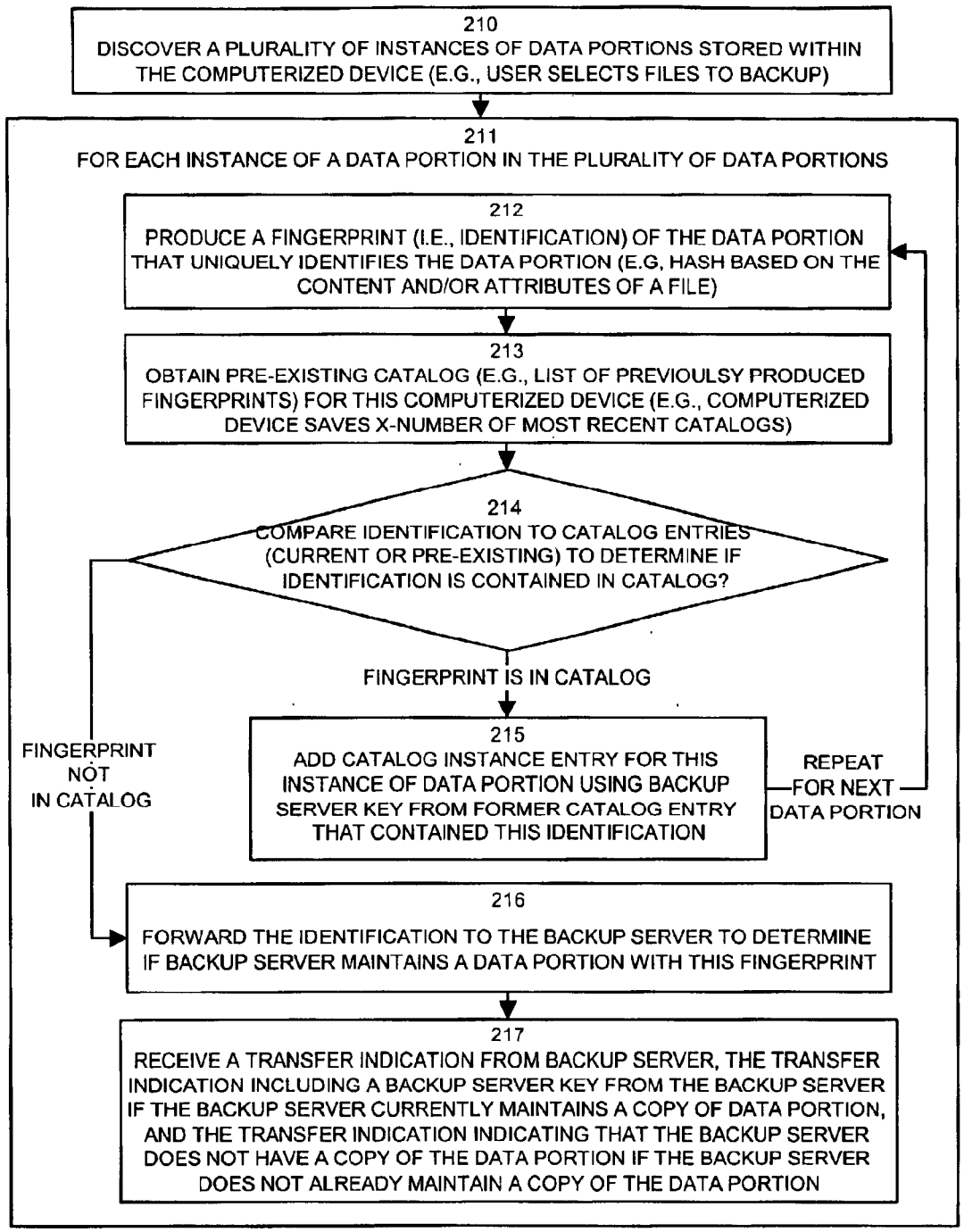
FIGS. 5 and 6 are a flow chart showing more detailed processing operations of a backup client configured according to one example embodiment of the invention.
Figure 6:
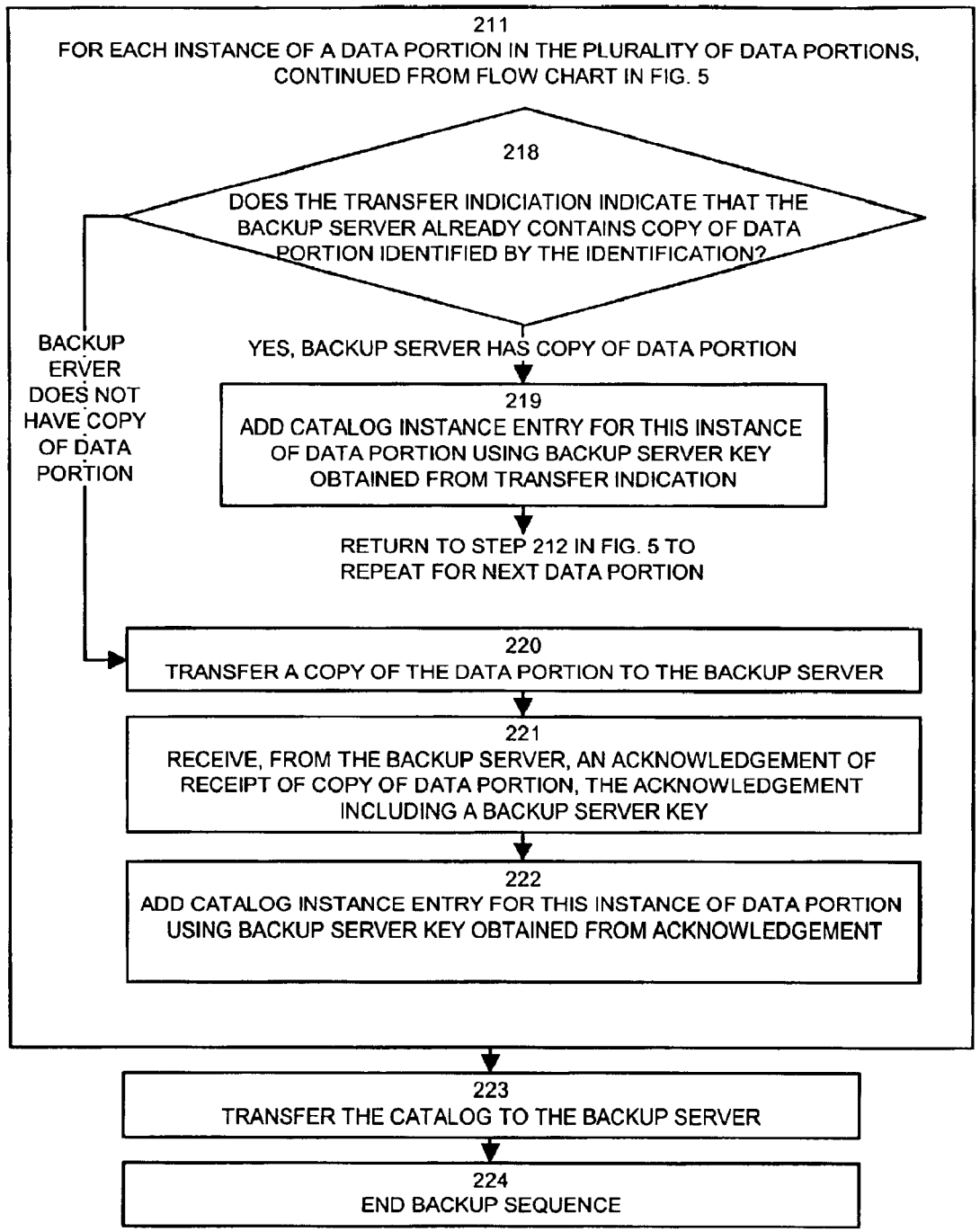

FIGS. 5 and 6 are a multi-page flow chart that illustrates a more detailed example processing that a backup client 150 configured according to one example embodiment of the invention performs in order to backup a set of data portions in a computerized device 110 such as a client computer system.

In step 210, the backup client 150 discovers a plurality of instances of data portions 160 stored within the computerized device 110. As an example, a user of a client computer system 110 may select a group of files such as a complete filesystem, disk partition, directory, volume or other area of the local storage device 128 to be backed up. Once the backup client 150 identifies or discovers the area of the local storage device 128 containing the plurality of data portions 160 to be backed up, the backup client 150 enters a processing loop defined by step 211 that includes step 212 through 222 in FIGS. 5 and 6.

In step 211, the backup client 150 enters a processing loop that is performed for each instance of a data portion 160 in a plurality of data portions discovered in step 210.

In step 212, the backup client 150 produces a fingerprint or other identification 194 of the data portion 160 (i.e., of the data or content stored within this instance of the data portion) that uniquely identifies the data portion 160. As an example, the fingerprint or identification 194 may be a hash or checksum value based upon the content of a file and/or on attributes of a file.

Next, in step 213, the backup client 150 obtains pre-existing catalog information for this computerized device (i.e., this client computer system 110). The pre-existing catalog information may include a list of previously produced fingerprints or identifications of data portions 160 existing within a previously produced catalog 165 and may also include the set of fingerprints 194 produced thus far during this backup sequence.

In step 214, the backup client 150 compares the identification or fingerprint produced in step 212 to catalog entries 301 in either the current or in a previous or pre-existing catalog 165 to determine if the identification 194 is already contained in the catalog 165. If the fingerprint or identification 194 is within the current or a pre-existing catalog 165, processing proceeds to step 215.

In step 215, the backup client 150 creates a catalog instance entry 320 for this instance of the data portion 160 using a backup server key 312 obtained from the previous catalog entry for creation of this catalog entry 301 (if this is the first instance of this data portion 160 discovered in this backup sequence) in the new or current catalog 165 being developed for this backup sequence. After processing step 215, backup client processing returns to step 212 to repeat this processing on another instance of the same or another data portion discovered in step 210. Thus, as a first (and fast) check, the backup client 150 determines if an already existing catalog 165 (that may be the current catalog, or an older catalog from any previous backup sequence) contains a catalog entry having the same identification 194, and if so, can assume that the backup server 130 already has a copy of the data portion 160, and thus only needs to create a catalog instance entry 320 in the current catalog 165 for this data portion before proceeding to process the next instance of a data portion. Note that if no catalog entry 301 yet exists in the current catalog for this data portion, then this structure can be created in step 215 along with the first instance entry 320 for this first instance of this data portion discovered for this backup sequence.

Returning attention to step 214, if the backup client 150 determines that the identification 194 is not contained in either the current or in a pre-existing catalog 165 associated with this client computer system 110, processing proceeds to step 216.

In step 216, the backup client forwards the fingerprint 194 (i.e., the identification) to the backup server 130 to determine if the backup server 130 maintains (i.e., stores as a backup) a data portion 160 with this fingerprint 194 within the backup database 170 (i.e., within the backup storage area 180).

Figure 7:
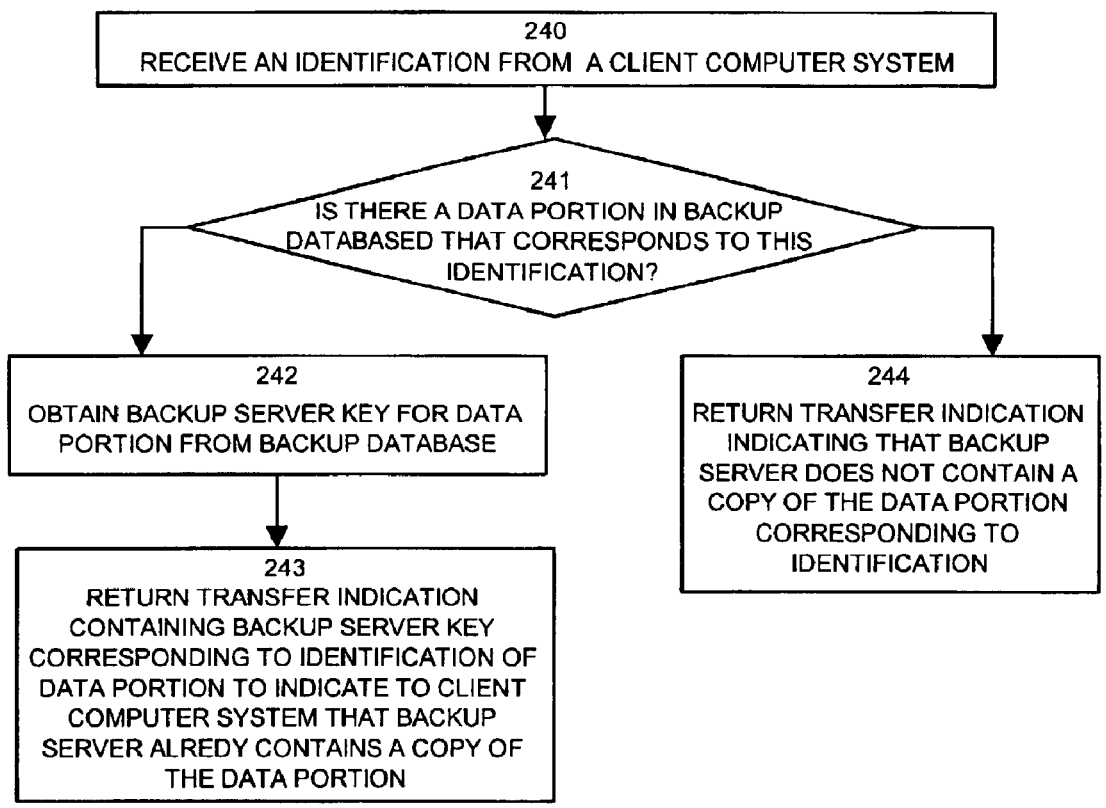
FIG. 7 is a flow chart showing processing operations performed by a backup server configured according to one example embodiment of the invention.

Turning attention now briefly to the flow chart of processing steps illustrated in FIG. 7, these step 240 through 244 illustrate details of processing operations performed by a backup server 130 in response to the backup client 150 processing step 216 in FIG. 5. In other words, after the backup client 150 processes step 216 in FIG. 5, backup server processing begins at step 240 in FIG. 7. Accordingly, prior to completing the discussion of backup client processing from steps 217 through 224 in FIGS. 5 and 6, backup server processing will be discussed with relation to processing steps in FIG. 7.

In step 240, in response to the backup client 150 forwarding the identification 194 (i.e., the fingerprint) to the backup server, the backup server 130 receives the identification 194 of a data portion 160 from the client computer system 110.

In step 241, the backup server 130 determines if there is a data portion 160 within the backup database 170 that corresponds to this identification 194. As noted above, the identification 194 may be, for example, a hash value, checksum or other unique identifier that uniquely identifies the content each different data portion 160 stored within the backup storage area 180. In step 241, if the backup server 130 determines that a data portion 160 exists within the backup storage area 180 that is associated with this identification 194, processing proceeds to step 242.

In step 242, the backup server 130 obtains an appropriate backup server key 312 that corresponds with the data portion 160 for this identification 194 from the backup database 170.

Next, in step 243, the backup server 130 returns a transfer indication 192 to the backup client 150 operating within the client computer system 110 that provided the identification 194 (in step 240). The transfer indication 192 contains the backup server key 312 that corresponds to the identification 194 of the data portion 160 in order to indicate to the backup client 150 operating in the client computer system 110 that the backup server 130 already contains a copy of the data portion 160. In this manner, embodiments of the invention allow the backup server 130 to indicate to the backup client 150 that the backup server already contains a copy of the data portion 160 stored within the backup storage area 180, and also provides the backup server key 312 that the backup client 150 receives and can use in the future to restore this data portion 160 to the client computer system's local storage area 128.

Returning attention back to Backup server processing in FIG. 7 and specifically to step 241, in the event that the backup server 130 determines that no data portion 160 exists within the backup storage area 180 that corresponds to the identification 194 (i.e., the identification 194 is not contained within the backup database 170) processing proceeds to step 244.

In step 244, the backup server 130 returns a transfer indication 192 to the client computer system 110 operating the backup server 150 that provided the identification 194 in step 240. In this case, to transfer indication 192 indicates that the backup server 130 does not contain a copy of the data portion 160 corresponding to the identification 194. Accordingly, no backup server key 312 is included within the transfer indication sent by the backup server 130 to the backup client 150 in step 244.

At this point in processing, either after processing step 243 to provide a transfer indication 192 containing a backup server key 312, or, after step 244 to provide a transfer indication 192 containing no backup server key 312, processing in the backup server 130 is complete for this transaction and attention is now directed to the backup client 150 that returns to step 217 in FIG. 5.

In step 217 in FIG. 5, the backup client 150 receives the transfer indication 192 from the backup server 130. As discussed above, a transfer indication 192 may include a backup server key 312, if the backup server 130 currently maintains a copy of the data portion associated with the identification 194. Alternatively, if the backup server 130 does not currently maintain a copy of the data portion 160, the transfer indication 192 indicates that the backup server 130 does not have a copy of the data portion 160 and will not contain a backup server key 312. After processing step 217, backup client processing proceeds to step 218 at the top of the flow chart that continues on FIG. 6.

In step 218, the backup client 150 determines if the transfer indication 190 indicates that the backup server 130 already contains a copy of the data portion 160 identified by the identification 194. If the transfer indication 192 includes a backup server key 312, then this condition indicates that the backup server 130 already has a copy of the data portion 160 and processing proceeds to step 219 for creation of a catalog entry for this instance of the data portion 160.

In step 219, the backup client 150 creates a catalog instance entry 320 for this instance of the data portion 160 (been processed in this iteration of the backup sequence) using the backup server key 312 obtained from the transfer indication 192. After processing step 219, backup client processing returns to step 212 in FIG. 5 to continue processing the backup sequence for the next data portion.

Returning attention back to step 218, if the backup client 250 determines that the transfer indication 192 indicates that the backup server 130 does not have a copy of the data portion 160, processing proceeds to step 220.

In step 220, the backup server 150 transfers a copy of the data portion 160 to the backup server 130 for storage within the backup storage area 180 and for entry of the identification 194 associated with this data portion 160 into the backup database 170. While not specifically shown in the flow charts, backup server processing at this point causes the backup server 130 to receive the data portion and associated identification 194 and to store the data portion 160 within the backup storage area 180 and to index the data portion based upon the identification 194 of the data portion. The backup server 130 also generates a backup server key 312 that may be based the identification 194 or on the copy of the data portion 160 stored within the backup storage area 180 and can return an acknowledgement that the data portion was stored. The acknowledgement includes the backup server key 312.

Returning attention to the flow chart in FIG. 6 of processing of the backup client 150, in step 221, the backup client 150 receives, from the backup server 130, an announcement of receipt of the copy of the data portion 160. In this example embodiment of the invention, the announcement includes the backup server key 312.

Next, in step 222 in FIG. 6, the backup client 150 adds a catalog instance entry 320 to this instance of the data portion 160 using the backup server key obtained from the announcement in step 221. In this manner, the catalog 165 is updated to reflect this instance (i.e., this copy) of the data portion discovered during the backup sequence. After processing of step 222 is complete, backup client processing repeats steps 212 through 222 within the processing defined by step 211 for each instance of each data portion in a plurality of data portions discovered in step 210. Accordingly, in this manner, the backup client 150 ensures that all data portions have their data or content stored within the backup storage area 180 and that a complete catalog is maintained by the backup client 150 for each instance of each data portion processed in this backup sequence.

After the processing defined by step 211 is complete, processing proceeds to step 223 at which point the backup client 150 transfers the catalog 165 produced during this backup sequence to the backup server 130 for safekeeping. Thereafter, processing proceeds to step 224 at which point the backup client 150 completes the backup sequence.

In this manner, the catalog 165 that a backup client 150 produces during a backup sequence provides a snapshot of the current state of all data portions stored within the local storage device 128 of the client computer system 110 upon which that backup client 150 executed (or at least of all data portion specified for backup in step 210). By saving each catalog 165 from each backup sequence into the backup storage area 180 of the backup server 130, recovery from complete destruction or loss of all local storage data within a local storage device 128 for a client computer system 110 is possible if the backup represents a full backup. As a backup client 150 performs more and more backup sequences, multiple catalogs 165 are produced. Each catalog 165 includes computerized device attribute information relating to a data and time of performance of the backup sequence associated with that catalog and an identity of the computerized device 110 to which that catalog is associated. As will be explained shortly, during every store operation, the backup client is able to obtain a previous catalog or catalogs 165 from the backup server 130 and is able to compare various catalogs to determine differences between the state of stored data portions in the computerized device 110 between a time of performance of backup sequences. This is because each catalog contains a complete snapshot of all information related to all instances of data portions processed for that backup sequence.

Figure 8:
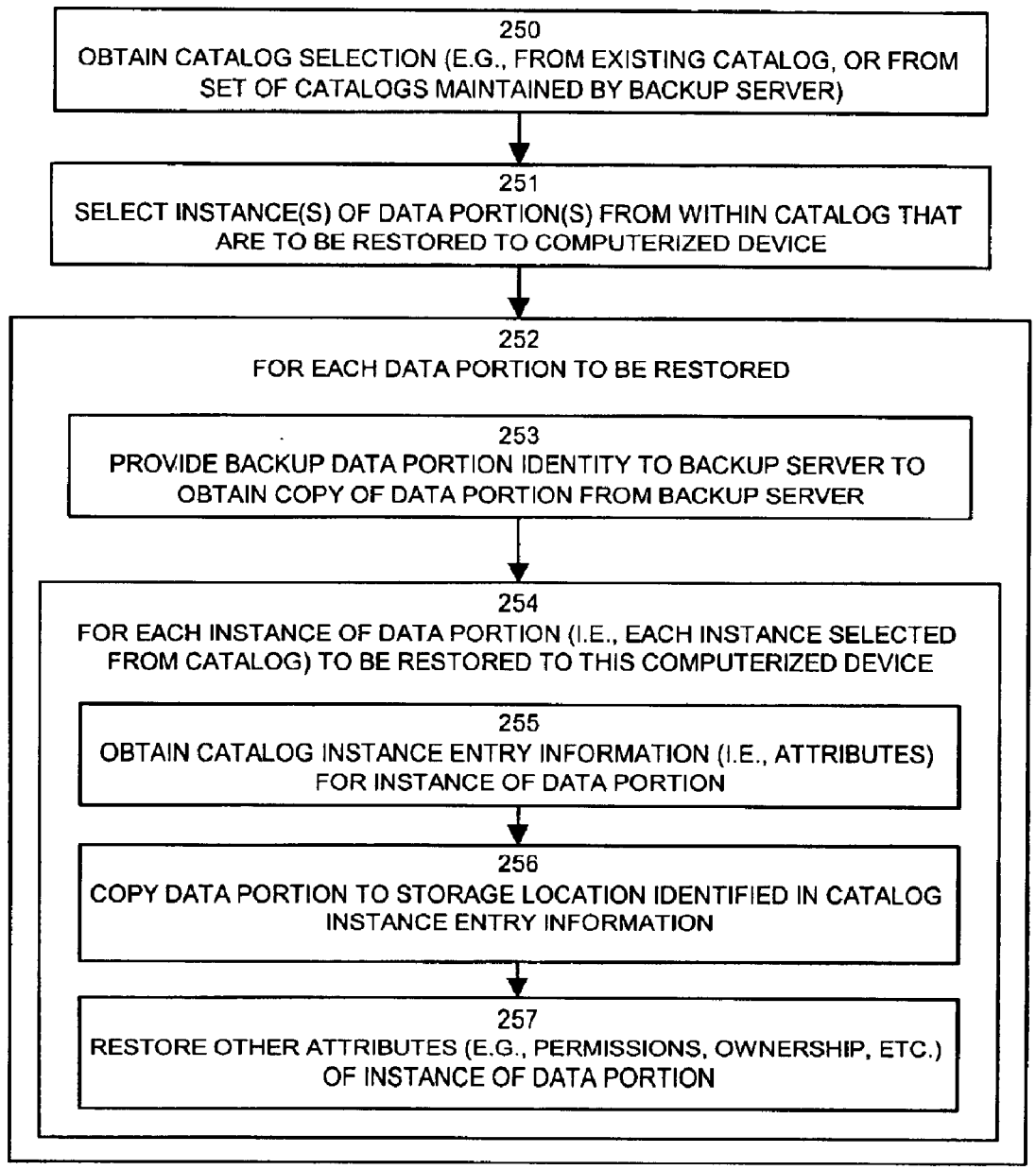
FIG. 8 is a flow chart showing processing operations of a backup client to restore data portions in accordance with one example embodiment of the invention.

FIG. 8 is a flow chart of processing steps that a backup client 150 performs according to one embodiment of the invention in order to restore instances of data portions to the local storage device 128 of a client computer system 110.

In step 250, the backup client obtains a catalog selection. The backup client 150 can obtain the catalog selection from the current existing catalog 165 already directly accessible to the client computer system 110 (e.g., already stored in the local storage device 128) or alternatively, from a set of previous catalogs 165-1 obtainable from the backup server 120 (i.e., stored within the backup storage area 180) or maintained by the backup client 150 in a cache of catalogs. Step 250 allows the user to browse or otherwise view and compare catalog information 165 from one of more catalogs in order to determine which instances of which data portions 160 are to be restored to the client computer system 110. This also allows the user to determine changes in the state of storage of data portions for a client computer system, since a full backup catalog reflects the entire set of data portions that existed at this time of that full backup sequence. This allows embodiments of the invention to be used to determine what data portions 160, since the time of a previous backup (reflected by the catalog for that previous backup) have been added and removed or moved in the client computer system 110.

In step 251, the backup client 150 selects instances of data portions from within the catalog(s) that are to be restored to the computerized device 110.

In step 252, the backup client enters a processing loop at which is performed for each data portion to be restored (i.e., each portion selected from one or more catalogs in step 251).

In step 253, the backup client 150 provides the identification 194 of a data portion 160 to the backup server 130 in order to obtain a copy of the content or data of the data portion 160 from the backup server 130. The processing of step 253 can involve, for example, providing a restore command to the backup server 130 along with an identification of a data portion 160 that is to be restored to a client computer system 110 upon which the backup client 150 is executing. The backup server 130 returns the data or content of the data portion 160 back to the backup client 150 in step 253. At this point then, the backup client 150 has a copy of the content of the data portion that can be restored into each instance location.

Next, in step 254, the backup client enters a processing loop that is performed for each instance 320 of the data portion 160 to be restored to this computerized device 10. As an example, if the user selected that all instances of a data portion 160 were to be restored from a particular catalog 165, the processing steps within step 254 would be performed for each instance entry 320 within the catalog entry 301 within this catalog 165 for this data portion 160.

In step 255, the backup client 150 obtains catalog instance entry information including the instance attribute metadata within the instance entry fields 330 through 334 for the instance entry 320 being processed in this iteration of step 254.

Next, in step 256, the backup client 155 copies the data or content of the data portion 160 (received in step 253 from the backup server 130) to the storage location identified by the catalog instance entry information (i.e., identified as the computerized device storage location field 330 for a particular instance entry 320 within the catalog 165). This causes the backup client 150 to place a copy of the data portion content or data at the appropriate storage location within the local storage device 128 coupled to the client computer system 110 for this instance of this data portion 160.

Next, in step 257, the backup client 150 restores other attributes associated with this instance of the data portion 160. This involves restoring the information contained within the general file attributes 332 and the computer specific file attributes 334 associated with this instance entry 320. In this manner, step 255 through 257 cause the backup client 150 to completely restore this instance of the data portion 160 to the client computer system 110. This processing is repeated for each instance of the data portion selected in step 251. After completion of all iterations of the loop defined by step 254, the processing of the loop defined by step 252 is repeated for the next data portion to be restored. Once all data portions 160 are restored in this manner, the restoration process is complete.

According to the aforementioned mechanisms and techniques, embodiments of the invention provide a unique backup and to restore process. Those skilled in the art will understand that various modifications and variations can be made to the aforementioned processing techniques will still achieving the general operation of embodiments of the invention. It is to be understood that such variations are intended to be covered by the scope of this invention. As such, the foregoing description of embodiments of the invention are not intended to be the limiting. Rather, any limitations to the invention are presented in the following claims.

What is claimed is:

1. A method for backing up data portions stored within a computerized device, the method comprising the steps of:

discovering a plurality of data portions stored within the computerized device; and for each data portion in the plurality of data portions, performing the steps of:
  (i) producing an identification of a data portion stored within the computerized device;
  (ii) conveying, to a backup server, the identification of the data portion stored within the computerized device;
  (iii) receiving a transfer indication from the backup server, the transfer indication indicating whether the backup server already contains a backed-up copy of the data portion based on the identification;
  (iv) determining if the transfer indication indicates that the backup server already contains a copy of the data portion identified by the identification, and if not, transferring a copy of the data portion to the backup server, such that the computerized device only provides a copy of the data portion to the backup server if the backup server does not already have a copy of the data portion; and
  (v) maintaining a catalog containing a catalog entry for each instance of the data portion stored within the computerized device, the catalog entry containing metadata specifying attributes associated with each instance of the data portion stored within the computerized device including the identification of the data portion.

2. The method of claim 1 comprising the step of transferring the catalog to the backup server.

3. The method of claim 2 wherein the steps of:
  i) discovering a plurality of data portions,
  ii) for each data portion in the plurality of data portions, producing an identification, conveying the identification, receiving a transfer indication and determining if the transfer indication indicates that the backup server already contains a copy of the data portion, and if not, transferring a copy of the data portion to the backup server;

iii) maintaining a catalog; and iv) transferring the catalog to the backup server;

are performed as a first backup sequence within the computerized device for a first plurality of data portions to produce a first catalog associated with the first backup sequence and are performed as a second backup sequence within the computerized device for a second plurality of data portions to produce a second catalog associated with the second backup sequence; and wherein the first and second catalogs identify, for each instance of a data portion discovered in the respective backup sequence associated with that catalog, metadata required to restore that instance of the data portion to a storage location associated with the at least one computerized device.

4. The method of claim 3 wherein during performance of the steps i through iv of the second backup sequence, the method comprises the step of:

after the step of discovering a plurality of data portions, determining if the identification of the data portion is contained within the first catalog maintained by the computerized device thus indicating that the data portion has been previously backed up at least once by the backup server, and if so, bypassing step ii in the second backup sequence such that only data portions for which an identification is not contained within the first catalog have their identification sent to the backup server during the second backup sequence.

5. The method of claim 3 wherein the first and second catalogs include computerized device attribute information relating to a data and time of performance of the backup sequence associated with that catalog and an identity of the computerized device to which that catalog is associated, and wherein the method comprises the steps of:

comparing the first and second catalogs to determine differences between the state of stored data portions in the computerized device between a time of performance of the first and second backup sequences.

6. The method of claim 3 wherein the computerized device is a first computerized devices, and wherein the first and a second computerized device each stores at least one instance of the same data portion; and wherein each of the first and second computerized devices performs at least one of the first and second backup sequences, such that if, during one of the first and second backup sequences being performed in one of the first and second computerized devices, the transfer indication indicates that the backup server already maintains a copy of the data portion, the computerized device performing that backup sequence does not transfer a copy of the data portion to the backup server.

7. The method of claim 6 wherein:

the first computerized device performs the first backup sequence to transfer a first data portion to the backup server; and wherein the second computerized device stores an instance of the first data portion and performs the first backup sequence during which the transfer indication received from the backup server indicates that backup server already maintains a copy of the first data portion such that the step of determining the second computerized device does not transfer a copy of the data portion to the backup server during the step of determining.

8. The method of claim 7 wherein the step of maintaining a catalog, performed during the first and second backup sequences on the first and second computerized devices comprises the step of creating a catalog entry containing metadata specifying attributes associated with the data portion that are specific to the instance of the data portion in the first and second computerized devices, respectively.

9. The method of claim 1 wherein the identification of a data portion is a fingerprint of the data portion that uniquely identifies the data portion and that is equivalent for each instance of a same data portion that may be stored in multiple locations within the at least one computerized device.

10. The method of claim 9 wherein the computerized device is a first computerized device, and wherein the first and a second computerized device each respectively store at least one instance of the same data portion, and wherein the identification produced in the step of producing an identification is that same for each instance of the same data portion when performed on each of the first and second computerized devices.

11. The method of claim 9, wherein the fingerprint of the data portion that uniquely identifies the data portion is selected from the group consisting of (a checksum, a hash, and a message digest) of the data portion.

12. A method for backing up data portions stored within a computerized device, the method comprising the steps of:

discovering a plurality of data portions stored within the computerized device; and for each data portion in the plurality of data portions, performing the steps of:

(i) producing an identification of a data portion stored within the computerized device;

(ii) determining if the identification of the data portion is contained within a preexisting catalog maintained by the computerized device thus indicating that the data portion has been previously backed up at least once by the backup server;

if the identification of the data portion is not contained within the pre-existing catalog, then performing the steps of:

(iii) conveying, to a backup server, the identification of the data portion stored within the computerized device;

(iv) receiving a transfer indication from the backup server, the transfer indication indicating whether the backup server already contains a backed-up copy of the data portion based on the identification; and (v) determining if the transfer indication indicates that the backup server already contains a copy of the data portion identified by the identification, and if not, transferring a copy of the data portion to the backup server, such that the computerized device only provides a copy of the data portion to the backup server if the backup server does not already have a copy of the data portion; and if the identification of the data portion is contained within the pre-existing catalog, then (vi) bypassing the steps of conveying the identification to the backup server, receiving a transfer indication from the backup server and determining if the transfer indication indicates that the backup server already contains a copy of the data portion, such that a copy of the data portion is not transferred to the backup server.

13. A method for backing up and restoring data portions to a computerized device, the method comprising the steps of:

performing the backup method of claim 1;

providing an identification of a data portion to be restored to the backup server to obtain a single copy of the data portion from the backup server;

restoring the single copy of the data portion to multiple locations within the computerized device; and updating each copy of the data portion restored to each of the multiple locations with attribute information specific to that copy of the data portion restored at that location.

14. The method of claim 13 further comprising the steps of:

receiving, based on the catalog of instances of data portions available for restoration to the computerized device, a selection of a plurality of instances of the data portion to be restored to the computerized device, each selected instance having a catalog instance entry defining a location within the computerized device at which the data portion is to be restored to the computerized device and defining the attribute information specific to that instance of that data portion restored at that location.

15. A computerized device comprising:

a memory;

a processor;

a communications interface;

a local storage device containing a plurality of data portions;

an interconnection mechanism coupling the memory the processor, the local storage device and the communications interface;

wherein the memory is encoded with logic instructions that form a backup client application that, when executed by the processor, performs a backup client process that causes the computerized device to back up the data portions stored within the local storage device to a backup server by performing the steps of:

discovering a plurality of data portions stored within the computerized device; and for each data portion in the plurality of data portions, performing the steps of:

(i) producing, in the memory, an identification of the data portion;

(ii) conveying, to a backup server over the communications interface, the identification of the data portion stored within the computerized device;

(iii) receiving, over the communications interface, a transfer indication from the backup server, the transfer indication indicating whether the backup server already contains a backed-up copy of the data portion based on the identification; and (iv) determining if the transfer indication indicates that the backup server already contains a copy of the data portion identified by the identification, and if not, transferring a copy of the data portion from the local storage device to the backup server over the communications interface, such that the computerized device only provides a copy of the data portion to the backup server if the backup server does not already have a copy of the data portion; and (v) maintaining a catalog containing a catalog entry for each instance of the data portion stored within the computerized device, the catalog entry containing metadata specifying attributes associated with each instance of the data portion stored within the computerized device including the identification of the data portion.

16. The computerized device of claim 15 wherein the backup server process causes the computerized device to perform the step of transferring the catalog to the backup server.

17. The computerized device of claim 16 wherein the steps of:

i) discovering a plurality of data portions, ii) for each data portion in the plurality of data portions, producing an identification, conveying the identification, receiving a transfer indication and determining if the transfer indication indicates that the backup server already contains a copy of the data portion, and if not, transferring a copy of the data portion to the backup server;

iii) maintaining a catalog; and iv) transferring the catalog to the backup server;

are performed by the backup client process as a first backup sequence within the computerized device for a first plurality of data portions to produce a first catalog associated with the first backup sequence and are performed as a second backup sequence within the computerized device for a second plurality of data portions to produce a second catalog associated with the second backup sequence; and wherein the first and second catalogs identify, for each instance of a data portion discovered in the respective backup sequence associated with that catalog, metadata required to restore that instance of the data portion to a storage location associated with the computerized device.

18. The computerized device of claim 17 wherein during performance of the steps i through iv of the second backup sequence, the backup server process causes the computerized device to perform the step of:

after the step of discovering a plurality of data portions, determining if the identification of the data portion is contained within the first catalog maintained by the computerized device thus indicating that the data portion has been previously backed up at least once by the backup server, and if so, bypassing step ii in the second backup sequence such that only data portions for which an identification is not contained within the first catalog have their identification sent to the backup server during the second backup sequence.

19. The computerized device of claim 17 wherein the first and second catalogs include computerized device attribute information relating to a data and time of performance of the backup sequence associated with that catalog and an identity of the computerized device to which that catalog is associated, and wherein the backup server process causes the computerized device to perform the step of:

comparing the first and second catalogs to determine differences between the state of stored data portions in the computerized device between a time of performance of the first and second backup sequences.

20. The computerized device of claim 17 wherein the computerized device is a first computerized device, and operates in parallel with a second computerized device, each computerized device storing at least one instance of the same data portion; and wherein each of the first and second computerized devices performs at least one of the first and second backup sequences, such that if, during one of the first and second backup sequences being performed in one of the first and second computerized devices, the transfer indication indicates that the backup server already maintains a copy of the data portion, the computerized device performing that backup sequence does not transfer a copy of the data portion to the backup server.

21. The computerized device of claim 20 wherein:
the first computerized device performs the first backup sequence to transfer a first data portion to the backup server; and
wherein the second computerized device stores an instance of the first data portion and performs the first backup sequence during which the transfer indication received from the backup server indicates that backup server already maintains a copy of the first data portion such that the step of determining the second computerized device does not transfer a copy of the data portion to the backup server during the step of determining.

22. The computerized device of claim 21 wherein when the backup client causes each of the computerized devices to perform the step of maintaining a catalog, performed during the first and second backup sequences on the first and second computerized devices, the backup client causes the computerized device to perform the step of:
creating a catalog entry containing metadata specifying attributes associated with the data portion that are specific to the instance of the data portion in the first and second computerized devices, respectively.

23. The computerized device of claim 15 wherein the identification of a data portion is a fingerprint of the data portion that uniquely identifies the data portion and that is equivalent for each instance of a same data portion that may be stored in multiple locations within the computerized device.

24. The computerized device of claim 23 wherein the computerized device is a first computerized device, and each of the first and a second computerized devices respectively store at least one instance of the same data portion, and wherein the identification produced in the step of producing an identification is that same for each instance of the same data portion when performed on each of the first and second computerized devices.

25. The computerized device of claim 23, wherein the fingerprint of the data portion that uniquely identifies the data portion is selected from the group consisting of (a checksum, a hash, and a message digest) of the data portion.

26. A computerized device comprising:
a memory;
a processor;
a communications interface;
a local storage device containing a plurality of data portions; and
an interconnection mechanism coupling the memory, the processor, the local storage device and the communications interface;
wherein the memory is encoded with logic instructions that form a backup client application that, when executed by the processor, performs a backup client process that causes the computerized device to back up the data portions stored within the local storage device to a backup server by performing the steps of:
discovering a plurality of data portions stored within the computerized device; and
for each data portion in the plurality of data portions, performing the steps of:

(i) producing, in the memory, an identification of the data portion;
(ii) determining if the identification of the data portion is contained within a preexisting catalog maintained by the computerized device thus indicating that the data portion has been previously backed up at least once by the backup server;
if the identification of the data portion is not contained within the pre-existing catalog, then performing the steps of:
(iii) conveying, to a backup server over the communications interface, the identification of the data portion stored within the computerized device;
(iv) receiving, over the communications interface, a transfer indication from the backup server, the transfer indication indicating whether the backup server already contains a backed-up copy of the data portion based on the identification; and
(v) determining if the transfer indication indicates that the backup server already contains a copy of the data portion identified by the identification, and if not, transferring a copy of the data portion from the local storage device to the backuD server over the communications interface, such that the computerized device only provides a copy of the data portion to the backup server if the backuD server does not already have a copy of the data portion; and
if the identification of the data portion is contained within the pre-existing catalog, then (vi) bypassing the steps of conveying the identification to the backup server, receiving a transfer indication from the backup server and determining if the transfer indication indicates that the backup server already contains a copy of the data portion, such that a copy of the data portion is not transferred to the backup server.

27. A computerized device comprising:
a memory;
a processor;
a communications interface;
a local storage device containing a plurality of data portions;
an interconnection mechanism coupling the memory, the processor, the local storage device and the communications interface;
wherein the memory is encoded with logic instructions that form a backup client application that, when executed by the processor, performs a backup client process that causes the computerized device to backup and restore data portions to the local storage device within the computerized device by performing the steps of:
performing the steps of backing up the data portions of claim 18;
providing an identification of the data portion to a backup server to obtain a single copy of the data portion from the backup server;
restoring the single copy of the data portion to multiple locations within the computerized device; and
updating each copy of the data portion restored to each of the multiple locations with attribute information specific to that copy of the data portion restored that location.

28. The computerized device of claim 27 wherein the backup client process causes the computerized device to perform the steps of:

receiving, based on the catalog of instances of data portions available for restoration to the computerized device, a selection of a plurality of instances of the data portion to be restored to the computerized device, each selected instance having a catalog instance entry defining a location within the computerized device at which the data portion is to be restored to the computerized device and defining the attribute information specific to that instance of that data portion restored at that location.

29. A computer program product having a computer-readable medium including computer program logic encoded thereon that, when performed in a computerized device having a coupling of a memory and a processor, programs the processor to perform a backup technique by performing the operations of:

discovering a plurality of data portions stored within the computerized device; and for each data portion in the plurality of data portions, performing the steps of:

(i) producing, in the memory, an identification of a data portion stored within a computerized device;

(ii) conveying, to a backup server over the communications interface, the identification of the data portion stored within the computerized device;

(iii) receiving, over the communications interface, a transfer indication from the backup server, the transfer indication indicating whether the backup server already contains a backed-up copy of the data portion based on the identification;

(iv) determining if the transfer indication indicates that the backup server already contains a copy of the data portion identified by the identification, and if not, transferring a copy of the data portion from the local storage device to the backup server over the communications interface, such that the computerized device only provides a copy of the data portion to the backup server if the backuD server does not alreadv have a copy of the data portion; and (v) maintaining a catalog containing a catalog entry for each instance of the data portion stored within the computerized device, the catalog entry containing metadata specifying attributes associated with each instance of the data portion stored within the computerized device including the identification of the data portion.

\* \* \* \* \*

UNITED STATES PATENT AND TRADEMARK OFFICE
CERTIFICATE OF CORRECTION

PATENT NO.   : 6,865,655 B1
DATED        : March 8, 2005
INVENTOR(S)  : Andersen It is certified that error appears in the above-identified patent and that said Letters Patent is hereby corrected as shown below:

<u>Title page,</u>
Item [75], Inventor, "Bryon Scott Andersen" should read -- Byron Scott Andersen --

Signed and Sealed this

Seventh Day of June, 2005

JON W. DUDAS
*Director of the United States Patent and Trademark Office*